US 8,245,630 B2

(12) United States Patent
Houraney

(10) Patent No.: US 8,245,630 B2
(45) Date of Patent: Aug. 21, 2012

(54) CORDLESS HAND HELD DEVICE AND METHOD OF HEATING/REHEATING FOOD

(76) Inventor: F. William Houraney, Loxahatchee, FL (US)

(*) Notice: Subject to any disclaimer, the term of this patent is extended or adjusted under 35 U.S.C. 154(b) by 548 days.

(21) Appl. No.: 12/380,940

(22) Filed: Mar. 5, 2009

(65) Prior Publication Data

US 2009/0223383 A1 Sep. 10, 2009

Related U.S. Application Data

(60) Provisional application No. 61/068,245, filed on Mar. 6, 2008.

(51) Int. Cl.
*A47J 36/24* (2006.01)

(52) U.S. Cl. ............ 99/330; 99/447; 99/483; 126/226; 126/369; 126/401; 219/240; 219/533; 239/136; 392/404

(58) Field of Classification Search ............ 99/330, 99/447, 483, 516; 68/222; 126/226, 369–369.3, 126/401; 219/277, 240, 533; 239/136; 392/401, 392/403, 404; *A47J 36/24*
See application file for complete search history.

(56) References Cited

U.S. PATENT DOCUMENTS

| 385,794 | A |   | 7/1888  | Davis              |         |
|---------|---|---|---------|--------------------|---------|
| 2,467,393 | A | * | 4/1949  | Leher              | 392/401 |
| 2,601,011 | A |   | 6/1952  | Wilcox             |         |
| 2,863,979 | A |   | 12/1958 | Fitzgerald         |         |
| 3,422,240 | A |   | 1/1969  | Parker             |         |
| 3,559,886 | A | * | 2/1971  | Howard             | 239/136 |
| 3,570,276 | A | * | 3/1971  | Frank              | 68/222  |
| 3,702,616 | A | * | 11/1972 | Mercer             | 132/272 |
| 3,749,092 | A | * | 7/1973  | Williams           | 604/24  |
| 4,114,022 | A | * | 9/1978  | Braulke, III       | 392/383 |
| 4,145,600 | A | * | 3/1979  | Walter et al.      | 219/222 |
| 4,326,119 | A | * | 4/1982  | Swiatosz           | 392/397 |
| 4,495,432 | A |   | 1/1985  | Katsuma et al.     |         |
| 4,897,525 | A |   | 1/1990  | Hirsch             |         |
| 5,420,961 | A | * | 5/1995  | Walker             | 392/404 |
| 5,642,570 | A | * | 7/1997  | Lee                | 34/98   |
| 5,857,262 | A | * | 1/1999  | Bonnema et al.     | 34/97   |
| 7,155,117 | B2 | * | 12/2006 | Leung et al.      | 392/404 |
| 2002/0157276 | A1 | * | 10/2002 | Mujica          | 34/97   |
| 2002/0178932 | A1 | * | 12/2002 | Cai             | 99/516  |

FOREIGN PATENT DOCUMENTS

DE 4307321 A1 * 10/1993

* cited by examiner

*Primary Examiner* — Stephen F Gerrity

(57) ABSTRACT

The invention relates to a portable cordless hand held device and method for heating or reheating food directly in a dish such as a plate, bowl, cup, platter or serving bowl with steam, hot air or their mix and applying this steam and/or heat to foods conveniently and at anytime needed or desired after the food has been served to the consumer at the table or otherwise.

11 Claims, 4 Drawing Sheets

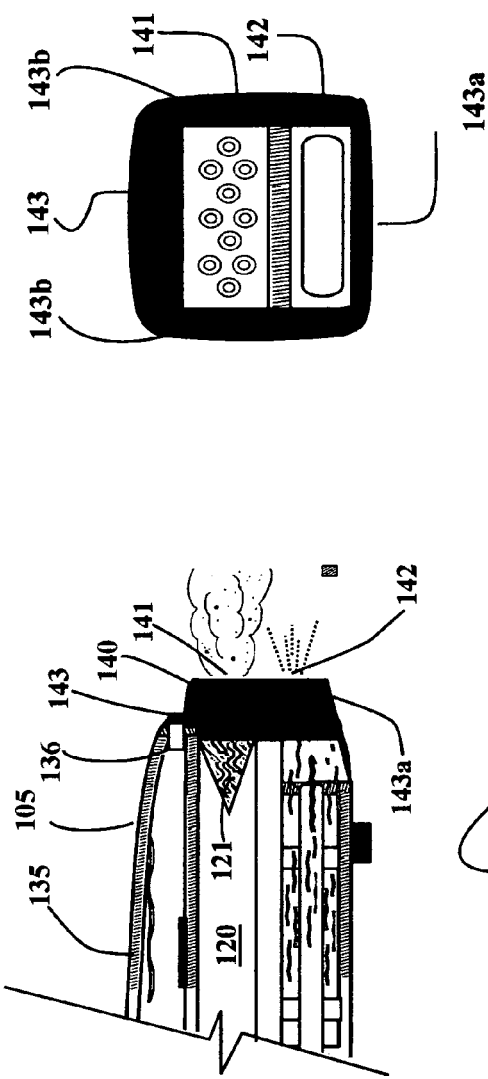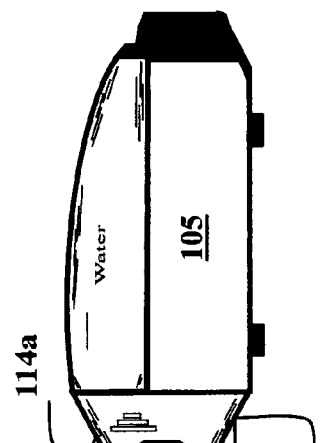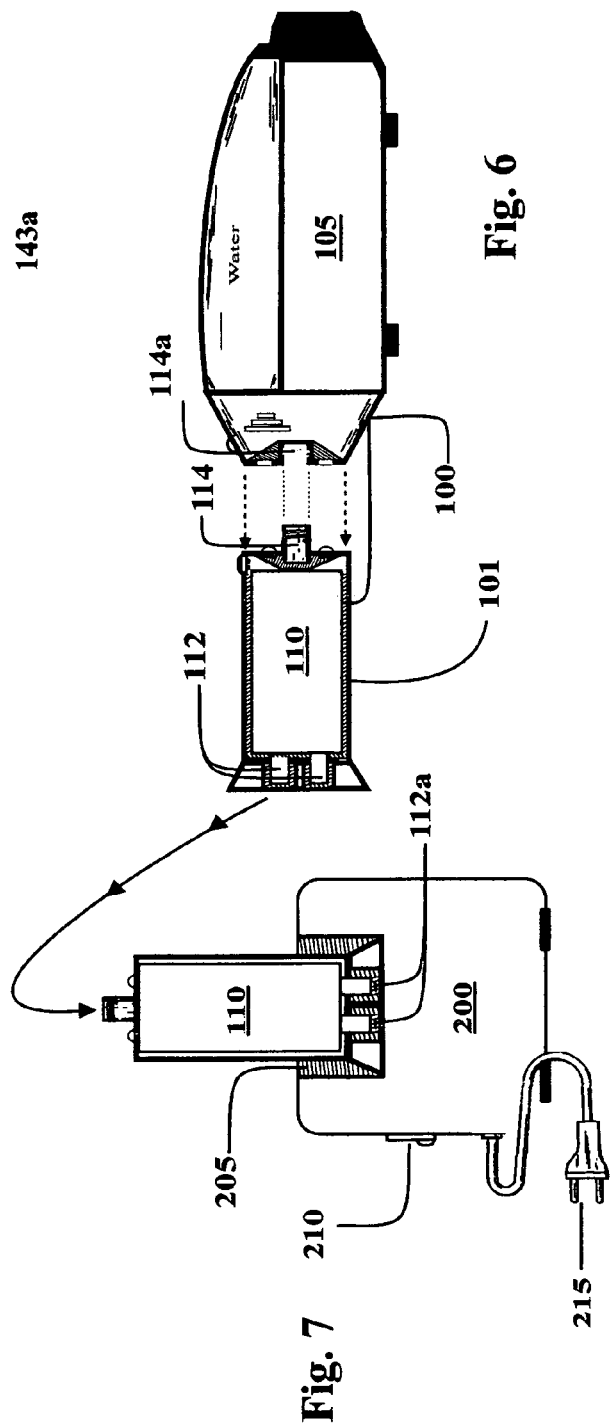

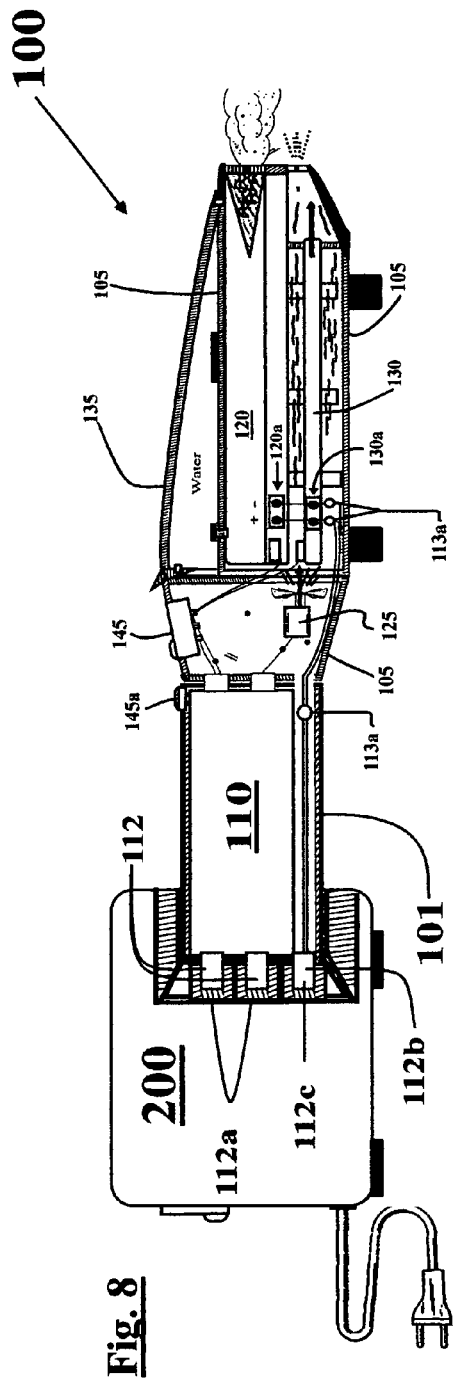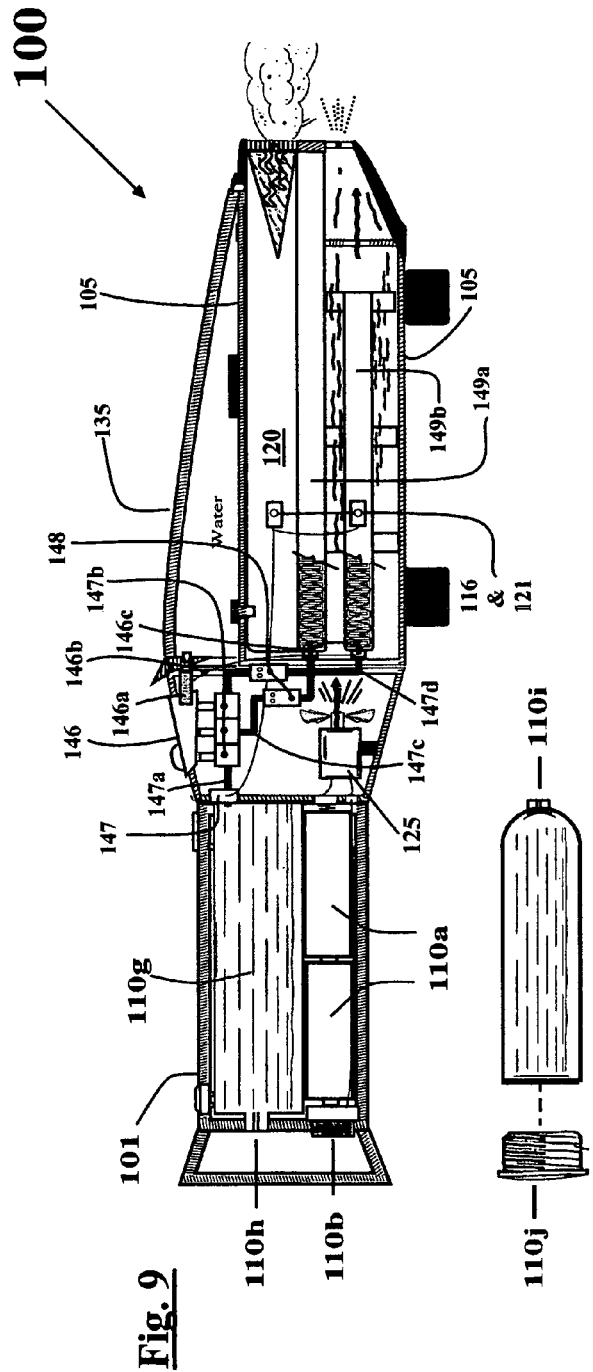

CORDLESS HAND HELD DEVICE AND METHOD OF HEATING/REHEATING FOOD

This Application relates to a Provisional Patent Application No. 61/068,245 dated Mar. 6, 2008, the priority of which is claimed

FIELD OF THE INVENTION

More particularly, the present invention relates to a cordless hand held device and method for heating food directly in a dish such as a plate, bowl, cup, platter or serving bowl with steam, hot air or their mix and applying this steam and/or heat to foods conveniently at the table after the food has been served to the consumer. A portable and convenient hand held device for the reheating of food is particularly useful in that the inevitable cooling of foods, that are served hot, can be reversed and therefore consumed at the foods most desirable condition at a timely pace dictated by the consumer and not the ambient room temperature, the length of the eating experience, or other cooling factors that may exist.

1. Background of the Invention

Since the beginning of hot foods, the problem has existed that the food served desirably hot, would cool down and lose the preferred taste. The approach has been to either reheat the food, to consume the food at a fast pace before the food has the time to cool down, or to accept the inevitability and eat cooled food. Today, the heating or reheating of food is mostly done with microwave ovens due to their speed and convenience. The well-known drawbacks for microwave ovens include the partial hardening or drying of the food and the time and inconvenience of transporting the food to and from the microwave which is generally located away from the table where the food is being consumed. There exist many steaming devices that are capable of heating or reheating foods but they are generally cumbersome, inconvenient, and not applicable, not designed, nor intended to address the purpose and claims of the present invention. Furthermore, after the meal the consumers have to clean the numerous components of these steaming or heating devices, which normally include a cooking basket for holding food, a cooking container to receive the cooking basket, a water container/boiler for supplying steam, a condensate collector if the condensate is not to be re-boiled and a removable lid. Thus, it is highly desirable for the users or consumers to have a device that is relatively lightweight, convenient to maneuver and operate, desirable and attractive when placed around food, and provides an easy method of reheating the food at the time and the place the food is being consumed. Therefore, in light of the foregoing deficiencies in the prior art, applicant's invention is herein presented.

2. Description of the Prior Art

Because of the need to reheat food after it has been initially prepared or cooked, there have been numerous mechanisms developed to achieve a desirable thermal conditioning of prepared foods. Most popular among these has been the microwave oven as originally described in Parker (U.S. Pat. No. 3,422,240). Numerous advancements and improvements have been developed and patented since this original device. The list of patents applicable to the microwave oven is numerous, cumbersome, and specifically unrelated to the present invention. The present invention overcomes the well-known drawbacks for microwave ovens such as the partial hardening or drying of the food and the time and inconvenience of transporting the food to and from the microwave which is generally located away from the table where the food is being consumed. There also exist many steaming devices that are capable of cooking, heating or reheating foods but they are generally cumbersome, inconvenient, and not applicable, not designed, nor intended to address the purpose and claims of the present invention. Since the inception of steam to cook foods as described in Davis (U.S. Pat. No. 385,794) to devices designed to heat food such as the steamer of Bratton (U.S. Pat. No. 4,495,432) and Hirsh (U.S. Pat. No. 4,897,525), these devices speak of an apparatus designed to cook or heat food by steam and are large fixtures powered by alternating electric current. Lastly, hot prepared foods commonly are thermally sustained by infrared heating devices. Wilcox (U.S. Pat. No. 2,601,011) and Fitzgerald (U.S. Pat. No. 2,863,979) utilize infrared heating lamps to maintain the thermal temperature of hot prepared foods.

The present invention obviates the disadvantages associated with the previous attempts of the prior art by providing the consumer an appealing, portable, convenient and economical method of reheating prepared foods.

OBJECTS AND ADVANTAGES

Accordingly, several objects and advantages of the present advantage:

a. to provide a cordless and convenient device and method for heating or reheating of food.

b. to provide a device and method for reestablishing the most desirable thermal condition of a prepared and served food at any time during the eating experience thus reversing the inevitable cooling of the food.

c. to provide a device and method for reestablishing the most desirable thermal condition of a prepared and served food at any time during the eating experience thus eliminating the need to eat faster in order to enjoy the food hot.

d. to provide a device and method for reestablishing the most desirable thermal condition and moisture of a prepared and served food at any time during the eating experience thus reinvigorating the food with any moisture that may have dissipated over time.

e. to provide a device and method for reheating food that is significantly easier to use than current heating appliances including microwave ovens.

f. to provide such a device that is relatively lightweight and easy and convenient to maneuver and operate.

g. to provide such a device that is desirable and attractive when placed around food or at the serving table.

h. to provide a device and method for reheating food that requires little or no cleaning work after the device is used.

i. to provide device and method for reheating food having a detachable water reservoir that is easily filled.

j. to provide such a device and method for reheating food that can operate independently of any other devices or attachments.

k. to provide such a device and method for reheating food that operates with at least one container attachment for containing and expediting operations on various foods and serving dishes.

l. to provide such a device and method for reheating food wherein the container attachments can be utilized independently providing additional heat retention to the hot foods being served.

m. to provide such a device that uses different voltages that may be found in various countries.

Other objects, features, and advantages of the present invention will become clear from the following description of the preferred embodiment when read in conjunction with the accompanying drawings and claims.

SUMMARY OF THE INVENTION

A cordless hand held device for reheating food with steam or hot air is provided. The food thermal conditioning device of the present invention includes a rechargeable power source, a multi-function discharge switch, a fan, a heater, a steam generator or boiler, and a removable water tank or reservoir. The first embodiment of the present invention preferably includes functionality to provide a consistent application of steam, heat or combination thereof to food directly or in concert with the container attachments described below.

The device includes a discharge outlet designed to conform to and insert in attachments provided and designed to encase the steam or hot air with the food to be heated. These attachments aid in expediting the heating or reheating of the food. These attachments are provided in various shapes and sizes to adapt to different types and sizes of serving containers. Also these container attachments may be utilized independently as a cover to keep the food hot or warm when initially served.

BRIEF DESCRIPTION OF THE DRAWING

The accompanying drawing illustrates diagrammatically non-limitative embodiment of the invention, as follows:

FIG. 4 illustrates the head portion of the front section and particularly the nozzle discharge apparatus.

FIG. 5 is a front illustration of the head portion and the nozzle discharge apparatus FIG. 6 is a side view of the present embodiment with a detachable handle.

FIG. 7 is a side illustration of the power recharging unit with the handle housing the rechargeable battery inserted.

FIG. 8 is a side illustration of another embodiment of the present invention wherein the device and the separate charger are reconfigured to provide power to the boiler and heater in advance of removing the device from the charging unit. In this embodiment, the handle is permanently attached to the housing and the charger is configured to engage the device conveniently as shown.

FIG. 9 is a side illustration of another embodiment of the present invention wherein the device and charger are powered by both battery cells and gas.

DETAILED DESCRIPTION OF THE INVENTION

Figure 1:
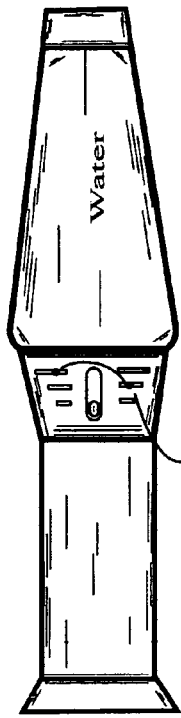
FIG. 1 is a side view of a first embodiment of the present invention.
Figure 2:
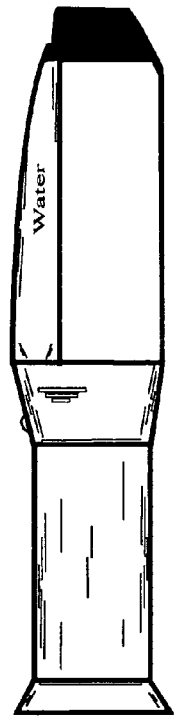
FIG. 2 is a top view of a first embodiment of the present invention
Figure 3:
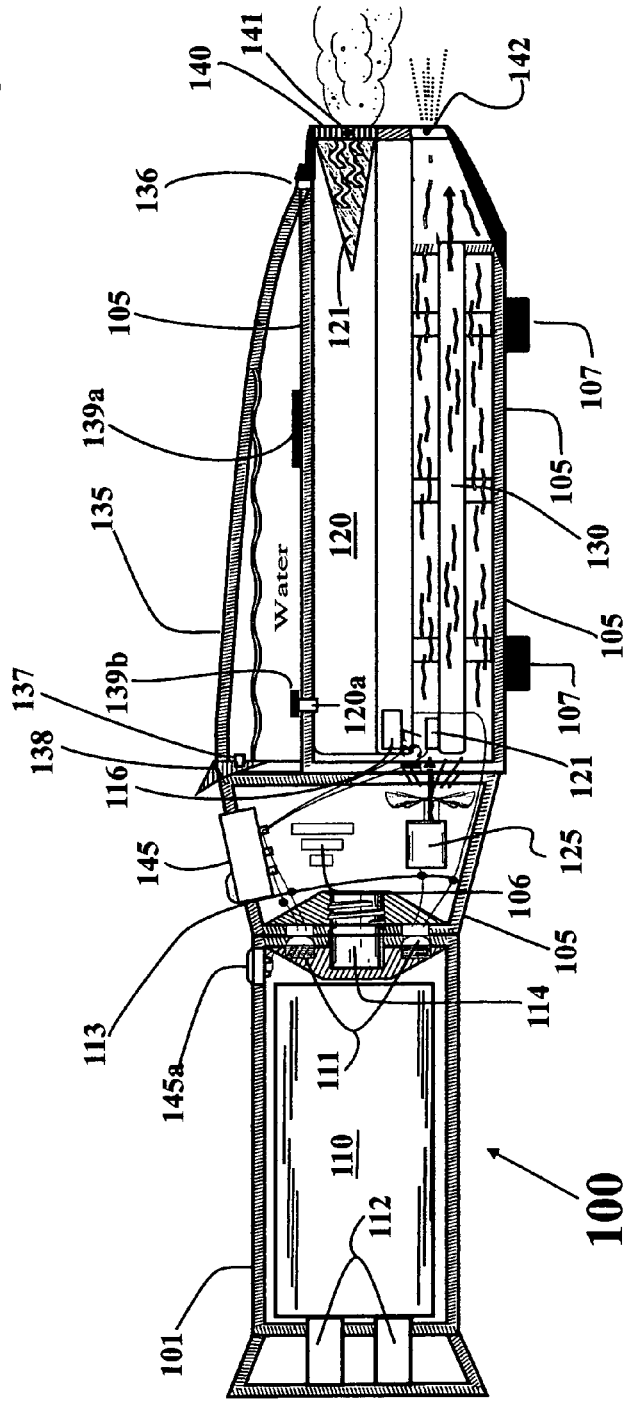
FIG. 3 is side section of the first embodiment of the present invention.

Referring to the figures and, in particular, FIG. 3, there is shown a preferred embodiment of a cordless hand held device generally represented by reference numeral 100. Cordless device 100 has a removable handle 101 that encloses a rechargeable battery 110a, and is attached and removed from housing 105 by means of a screw lock 114. Housing 105 encloses a boiler 120, a fan 125, a heater 130, and a detachable water reservoir 135. Housing 105 has a nozzle 140 at a head portion end thereof. Said nozzle has 2 separate opening configurations. 141 represents small hole openings for the discharge of steam and 142 represents a open orifice for the discharge of hot air. Housing 105 is provided with cold air inlet grills 106 and rubber feet 107. The rechargeable battery 110a is powered through inlets 112 and provides power to the present embodiment through spring loaded contacts 111. Functionality is selectively applied through a multi-function switch 145 located at the top of the device. The multi-function switch 145 is attached to rechargeable battery 110a, the heater 130, the boiler 120, and the fan 125 by insulated wires 113. The switch permits three modes of functionality and a 'power off' position as indicated by indicator light 145a which illuminates when switch 145 is positioned in any one of the three functional modes requiring power. Switch 145 enables three functions; steam discharge, hot air discharge, or a combination of both. The steam discharge mode provides water from the reservoir 135 to the boiler 120 through water pipe 120a. Boiler 120 uses electrical power to produce heat for converting the water from reservoir 135 to steam. Boiler 120 may be a "flash" boiler, capable of producing steam almost instantaneously upon the introduction of water from water pipe 120a. The steam pressure generated in boiler 120, section illustration 121, is discharged (i.e., expelled) through a dedicated number of openings 141 disposed in an outer surface of the head portion 140 of the device. The hot air mode of selection switch 145 actuates fan 125 and heater 130. The hot air current created is discharged through an orifice 142 disposed in an outer surface of the head portion 140 of the device. The combination mode actuates both the steam discharge, boiler 130, and the hot air discharge, fan 125 and heater 130, simultaneously providing an expedited moist heating of the food. Both the boiler 120 and the heater 130 are provided with safety switches, 116 and 121 respectively, which automatically cut off the power if the unit overheats. It should be appreciated that the boiler and or the heater may be varied to include any type of steam generator and or heat producing elements compatible with the other aspects of the present invention. Selection discharge switch 145 may operate to cause a variable amount of power to be applied depending upon the amount of actuation by a user. Also, switch 145 may be locked or fixed in position to cause a constant amount of electrical power to be applied without further actuation by a user and until user or safety switches stop the actuation. Water reservoir 135 is preferably detachable (i.e., removable) from housing 105. In a preferred embodiment, reservoir 135 is connected to the device 100 at the front end of the device 136 and at the back portion of the reservoir at 137. Reservoir 135 is selectively released by actuation of a reservoir release button 138. Upon detachment from housing 105, reservoir 135 may be conveniently filled with a liquid such as water. Reservoir 135 may be filled through a fill port 139a. At fill point 139a and at pump feed point 139b, the openings include plugs, or gaskets to prevent spillage while water tank 135 is disengaged from housing 105 and to prevent leaking when attached to housing 105. In one aspect of the present invention, reservoir 135 is preferably at least partially translucent to facilitate a visual determination of the amount of water contained present in reservoir 135.

Referring to FIG. 4 and specifically FIG. 5, the head portion of the front section and particularly the nozzle discharge apparatus is shown. The front discharge apparatus contains dedicated number of openings 141 disposed in an outer surface of the head portion 140 of the device for the discharge of steam. Orifice 142 is disposed in an outer surface of the head portion 140 of the device for the discharge of hot air. The present invention includes a front discharge outlet designed to conform to and insert in attachments as shown in FIGS. 10-13. The attachments are provided and designed to encase the steam or hot air with the food to be heated. Referring to FIG. 4 and FIG. 5, rubber or similar material is used to seal the junction of the front nozzle openings in the present embodiment with the attachments. 143, 143a, and 143b represent the top, bottom and sides respectively of the rubber or gasket like material that is employed at the head portion of housing 105. When inserted into the attachments, FIG. 10-12, the gasket like material provides a seal to help contain the steam and heat surrounding the food within the attachment 305.

Referring to FIG. 6, there is a device 100 in the preferred embodiment of the present invention with detached handle 101 containing rechargeable battery 110. Screw lock 114 and screw receptor 114a is provided to attach and secure handle 101 to housing 105. Screw lock 114 is engaged and disengaged from screw receptor 114a by twisting the handle 101 clockwise and counter clockwise respectively. Variations of means of attaching handle 101 to housing 105 are well known to those skilled in the art and can be provided in other embodiments of the present invention to achieve the same function. Rechargeable battery 110 is attached to battery charger 200 by removing handle 101 from housing 105 and inserting handle 101 into opening 205 as illustrated in FIG. 7. At opening 205, the rechargeable battery contacts 112 will engage battery charger receptacles 112a to facilitate charging of battery 110. In the preferred embodiment of the present invention, power for operations is derived solely from a rechargeable battery 110. Said battery derives its power from battery charger 200 attached to an electrical power outlet by means of cord 215 as common in the art. Switch 210 facilitates a selection of different voltages that may be found in different countries (e.g., a range of about 100 VAC to about 230 VAC)

Referring to FIG. 8, in another embodiment of the present invention, device 100 and charger 200 are reconfigured to provide power to the charged boiler 120 and the charged heater 130 in advance of removing the apparatus from charging unit 200 thus minimizing the power requirements and maximizing the functional duration of the rechargeable battery 110. The fan 125, the status indicator light 145a, and actuator switch 145 are powered by the rechargeable battery 110. The boiler 120 and the heater 130 by means of contact with the charging unit 200. In this embodiment, handle 101 is permanently attached to housing 105 and charger 200 is configured to engage handle 101 at the side of the unit so as to achieve easy coupling of the charger and the device 100. Charging the battery, the boiler and the heater are accomplished by inserting device 100 into the charger 200. Battery contacts 112 will engage battery charger receptacles 112a to charge the battery. Contacts 112b engage charger contact 112c to charge boiler 120 and heater.130 through conduits 113a connected as illustrated at 120a and 130a respectively.

Referring to FIG. 9, in another embodiment of the present invention, device 100 is powered by battery cells 110a and by LPG or butane gas as represented by 110g and 110i respectively. In this embodiment, handle 101 is permanently attached to housing 105. Battery cells 110a can be removed from handle 101 by means of door contact 110b. Gas reservoir 110g is refilled by means of gas injecting valve 110h or replaceable butane gas cylinder 110i is removed via screw opening 110j. Gas is provided to valves 147b through conduit 147a. Actuator switch 146 may be a slide or other three way switch serving to open or close gas valves 147b serving burner 149a and burner 149b via conduits 147c and 147d respectively. Switch 146 also operates igniter 146a, preferably an electrical means such as a piezo-electric device. The igniter 146a is connected to ignition plug 146c by means of wiring 146b. The gas flow may include a valve only opened when the supply voltage is sufficient to operate the igniter. A flame or temperature detector may be included to operate fan 125 only when the burner is lit. Air intakes 148 allow air to mix with the gas to enable combustion in said burners. The gas reservoir or bottle gas 110g and 110i, catalytic or flameless burner 149a and burner 149b, igniter 146a and plugs 146c, air inlets 148, valves 147b, operating switch 146, fan 125, thermal safety probes 116 and 121, gas-interrupting sensor 147, are all well known conventional elements which are commercially available.

Figure 10:
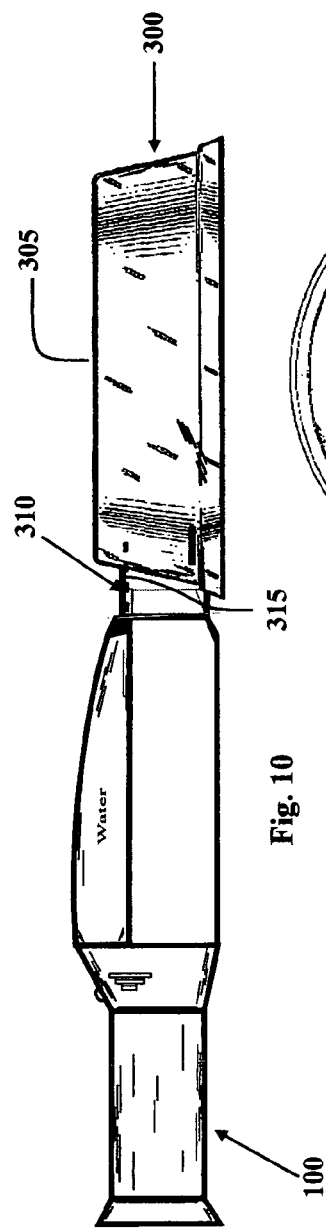
FIG. 10 is a side elevation the first embodiment of the present invention with at least one container attachment.
Figure 11:
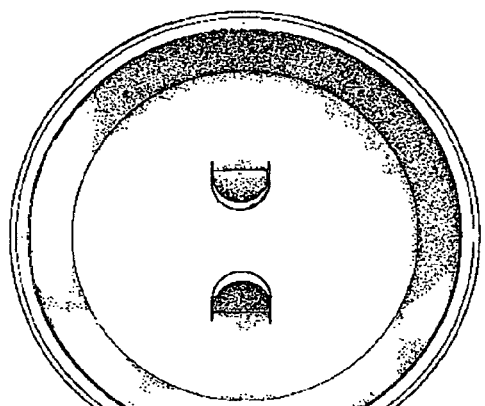
FIG. 11 is the top view illustrating the first embodiment of the present invention with at least one container attachment.
Figure 13:
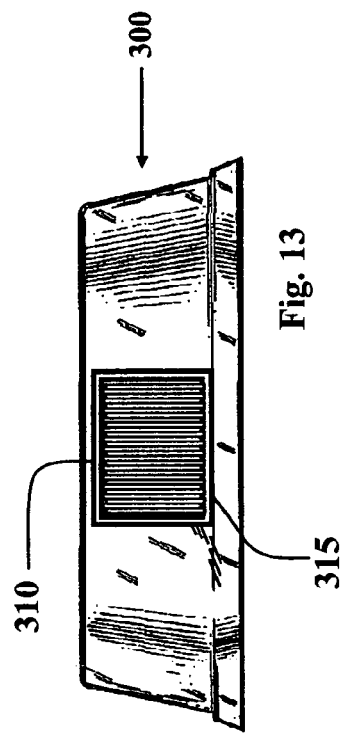
FIG. 13 is a side view of the attachment with the opening door/flap closed to promote the insulating and heat retaining function of the attachment when and if it is utilized independently of the device.
Figure 12:
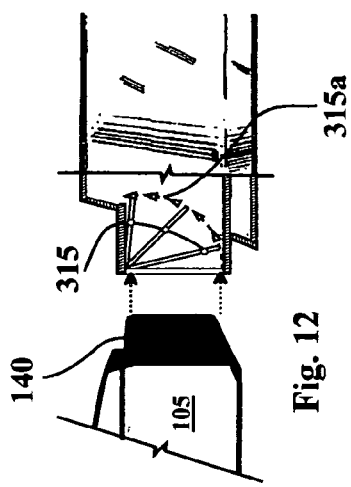
FIG. 12 is a side view of the head portion and the attachment illustrating the insertion of the head portion into the attachment causing the attachment door/flap to open to allow the steam/heat discharge to enter into the attachment.

Referring to FIG. 10 side view and FIG. 11 top view, the present embodiment 100 is shown with one type or design of attachment 300. Attachment 300 includes container cover 305 and inlet 310. Flexible flap 315 is provided at inlet 310 to close the opening providing containment of heat when attachment 300 is used independently of device 100. As shown in FIG. 12, the flap 315 swings up, in the direction as illustrated in 315a, opening inlet 310 when front nozzle 140 is inserted into attachment 300. FIG. 13 shows a side view of attachment 300 with inlet 310 illustrated with flap 315 hanging down in the closed position. These attachments aid in expediting the heating or reheating of the food. They are provided in various shapes and sizes to adapt to different types and sizes of serving containers such as dinner plates, dessert plates, bowls, bread baskets, and similar food serving wares. Also these container attachments may be utilized independently as a cover to keep the food hot or warm when initially served. The attachments can be manufactured with a light disposable type plastics, resilient plastics such polystyrene foam, commonly known as Styrofoam, or any other coated paper insulating material that provides an adequate insulating function at an economical cost. The flexible flap 315 can be produced and incorporated with the cover 300 by various methods familiar to those skilled in the art.

It should be appreciated by those skilled in the art that the particular device functions, design, and other aspects of the teachings herein are but examples of the present invention. Thus, they do not limit the scope or variety of applications that the present invention may be suitably implemented. Thus, it should be understood that the foregoing description is only illustrative of a present implementation of the teachings herein. Various alternatives and modification may be devised by those skilled in the art without departing from the present invention. Accordingly, the present invention is intended to embrace all such alternatives, modifications, and variances that fall within the scope of the disclosure herein.

What I claim as my invention is:

1. A hand-held and cordless device for heating or reheating food comprising:
   an outer body constructed from a substantially lightweight, liquid impermeable material;
   wherein the outer body comprises a reservoir adapted to hold water, a housing, and a handle to house an energy source which is the sole source of energy for the device;
   wherein the outer body includes a means for generating steam powered by the energy source;
   wherein the outer body includes a means for generating hot air powered by the energy source;
   wherein the outer body includes orifices to discharge steam or hot air;

wherein the outer body includes an electronic switch capable of actuating the means for generating steam and the means for generating hot air in order to produce steam, hot air, or a combination of steam and hot air; and wherein the outer body includes a means for attaching an enclosed dome or container attachment.

2. The hand held and cordless device of claim 1, wherein the reservoir is formed from plastic.

3. The hand held and cordless device of claim 1, wherein the reservoir is removable from the outer body.

4. The hand held and cordless device of claim 1, wherein the means for generating steam includes a boiler.

5. The hand held and cordless device of claim 1, wherein the means for generating hot air includes a heater and a fan.

6. The hand held and cordless device of claim 1, wherein the electronic switch comprises a multi-function switch providing a steam discharge function, a hot air discharge function, a combination of steam and hot air function, and a device off function.

7. The hand held and cordless device of claim 1, wherein the energy source comprises a rechargeable battery located within the handle.

8. The hand held and cordless device of claim 7, wherein the rechargeable battery is adapted to be recharged by a separate charging device.

9. The hand held and cordless device of claim 1, wherein the energy source comprises liquid petroleum gas or propane cylinder located within the handle.

10. The hand held and cordless device of claim 9, wherein the cylinder is refillable or replaceable.

11. The hand held and cordless device of claim 1, wherein the enclosed dome or container attachment is formed from lightweight and liquid impermeable material that will retain steam or hot air.

* * * * *